United States Patent
Jeong et al.

(10) Patent No.: US 11,017,944 B2
(45) Date of Patent: May 25, 2021

(54) MULTILAYER CERAMIC ELECTRONIC COMPONENT

(71) Applicant: SAMSUNG ELECTRO-MECHANICS CO., LTD., Suwon-si (KR)

(72) Inventors: Do Young Jeong, Suwon-si (KR); Je Jung Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 59 days.

(21) Appl. No.: 16/195,064

(22) Filed: Nov. 19, 2018

(65) Prior Publication Data

US 2020/0105467 A1 Apr. 2, 2020

(30) Foreign Application Priority Data

Oct. 2, 2018 (KR) .................. 10-2018-0117401

(51) Int. Cl.
*H01G 4/008* (2006.01)
*H01G 4/30* (2006.01)
*H01G 4/012* (2006.01)
*H01G 4/232* (2006.01)
*H01G 4/12* (2006.01)
*H01G 4/248* (2006.01)

(52) U.S. Cl.
CPC ............ *H01G 4/008* (2013.01); *H01G 4/012* (2013.01); *H01G 4/2325* (2013.01); *H01G 4/30* (2013.01); *H01G 4/1227* (2013.01); *H01G 4/248* (2013.01)

(58) Field of Classification Search
USPC .... 361/321.1, 301.4, 303, 321.2, 305, 321.3
See application file for complete search history.

(56) References Cited

U.S. PATENT DOCUMENTS

| | | | |
|---|---|---|---|
| 2006/0250747 A1* | 11/2006 | Takashima | H01G 4/232 361/272 |
| 2010/0002356 A1* | 1/2010 | Yoshida | H01G 4/30 361/301.4 |
| 2011/0007449 A1 | 1/2011 | Seo et al. | |
| 2013/0342081 A1 | 12/2013 | Kuroda et al. | |

(Continued)

FOREIGN PATENT DOCUMENTS

| | | |
|---|---|---|
| JP | 2011-018874 A | 1/2011 |
| JP | 2014-027255 A | 2/2014 |
| JP | 2014-220324 A | 11/2014 |

*Primary Examiner* — Arun Ramaswamy
(74) *Attorney, Agent, or Firm* — Morgan, Lewis & Bockius LLP

(57) ABSTRACT

A multilayer ceramic electronic component includes a ceramic body including dielectric layers and a plurality of first and second internal electrodes disposed to face each other with each of the dielectric layers interposed therebetween, and first and second external electrodes disposed on external surfaces of the ceramic body and electrically connected to the first and second internal electrodes, respectively. The first internal electrodes are exposed to a first surface of the ceramic body and the second internal electrodes are exposed to a second surface, opposing the first surface of the ceramic body. Strength enhancing material layers are disposed, respectively, between the first and second internal electrodes disposed to face each other.

11 Claims, 3 Drawing Sheets

(56) References Cited

U.S. PATENT DOCUMENTS

| | | | |
|---|---|---|---|
| 2016/0104577 A1* | 4/2016 | Cho | H01G 4/30 |
| | | | 361/301.4 |
| 2016/0196922 A1* | 7/2016 | Omori | H01G 4/30 |
| | | | 361/301.4 |
| 2016/0233024 A1* | 8/2016 | Kim | H01G 4/012 |

* cited by examiner

MULTILAYER CERAMIC ELECTRONIC COMPONENT

CROSS-REFERENCE TO RELATED APPLICATION(S)

This application claims the benefit of priority to Korean Patent Application No. 10-2018-0117401 filed on Oct. 2, 2018 in the Korean Intellectual Property Office, the disclosure of which is incorporated herein by reference in its entirety.

BACKGROUND

1. Field

The present disclosure relates to a multilayer ceramic electronic component, and more particularly, to a multilayer ceramic electronic component having excellent reliability.

2. Description of Related Art

With the recent trend for the downsizing, thinning, and multifunctionalization of electronic products, multilayer ceramic capacitors have also been required to be miniaturized and the mounting of multilayer ceramic capacitors has also been highly integrated.

A multilayer ceramic capacitor, a type of electronic component, is mounted on the printed circuit boards of various types of electronic products, including display devices such as a liquid crystal display (LCD), a plasma display panel (PDP), and the like, computers, personal digital assistants (PDAs), mobile phones, and the like, serving to charge or discharge electricity.

Such a multilayer ceramic capacitor may be used as a component of various types of electronic devices, due to advantages thereof such as compactness, high capacitance, and ease of mounting.

Recently, as industrial interest in electric components has increased, multilayer ceramic capacitors have been required to have high-reliability and high-strength characteristics to be used in automobile or infotainment systems.

In detail, a multilayer ceramic capacitor is required to have high flexural strength characteristics. Accordingly, internal and external structures for improving flexural characteristics need to be improved.

SUMMARY

An aspect of the present disclosure is to provide a multilayer ceramic electronic component having excellent reliability.

According to an aspect of the present disclosure, a multilayer ceramic electronic component includes a ceramic body including dielectric layers and a plurality of first and second internal electrodes disposed to face each other with each of the dielectric layers interposed therebetween, the ceramic body having first and second surfaces disposed to oppose each other in a first direction, third and fourth surfaces connected to the first and second surfaces and disposed to oppose each other in a second direction, and fifth and sixth surfaces connected to the first to fourth surfaces and disposed to oppose each other in a third direction, and first and second external electrodes disposed on external surfaces of the ceramic body and electrically connected to the first and second internal electrodes, respectively. The first internal electrodes are exposed to the first surface of the ceramic body and the second internal electrodes are exposed to the second surface of the ceramic body. Strength enhancing material layers are disposed, respectively, between the first and second internal electrodes disposed to face each other.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

Figure 1:
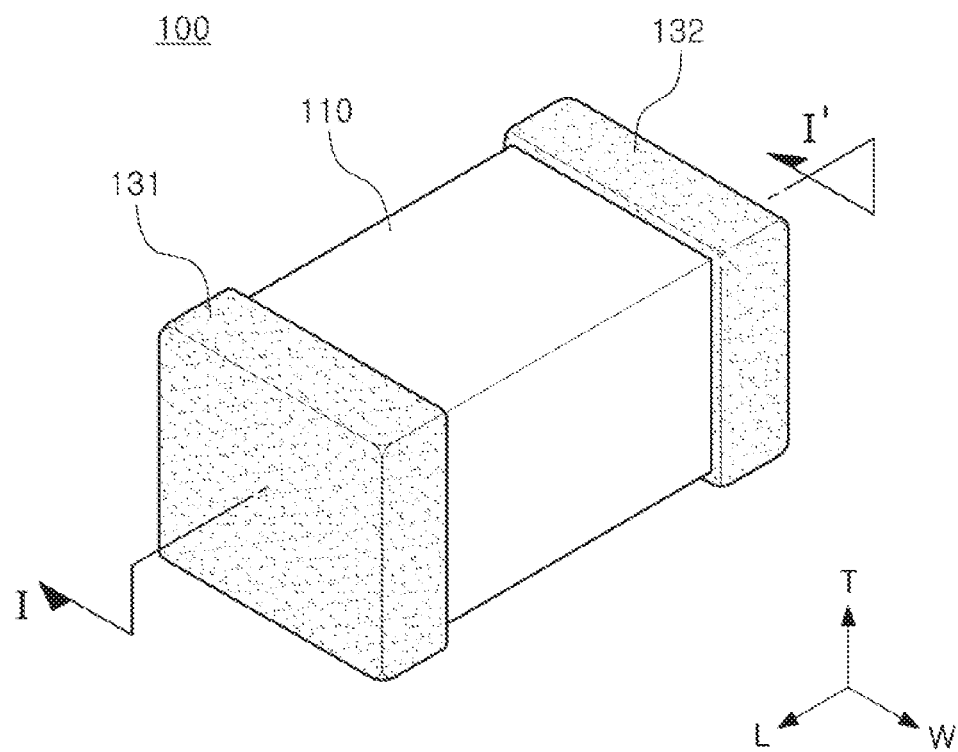
FIG. 1 is a perspective view of a multilayer ceramic capacitor according to an exemplary embodiment in the present disclosure.
Figure 2:
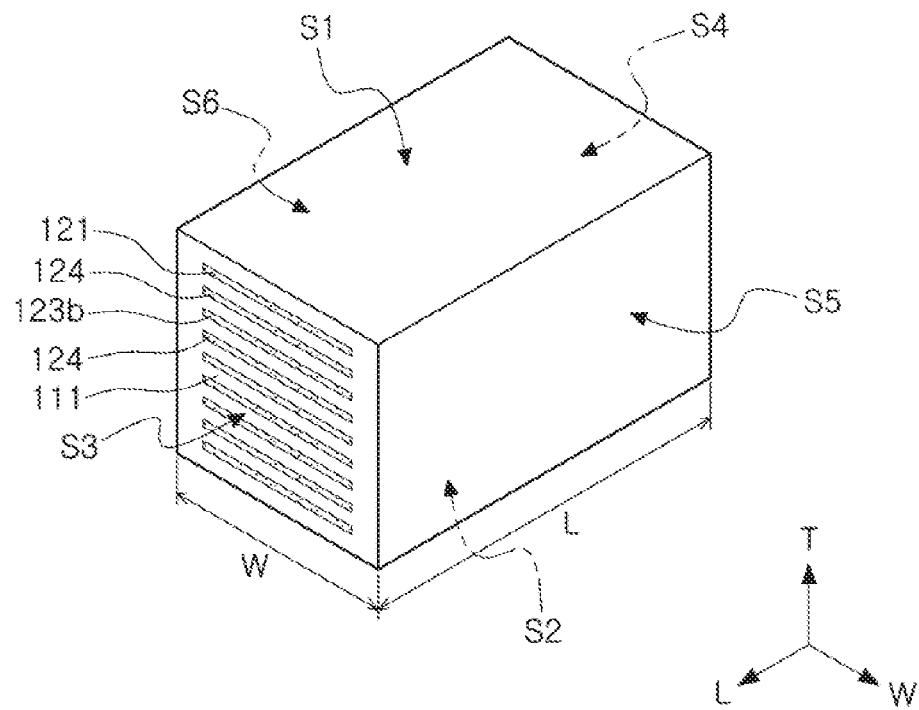
FIG. 2 is a schematic diagram of a ceramic body according to an exemplary embodiment of the present disclosure.
Figure 3:
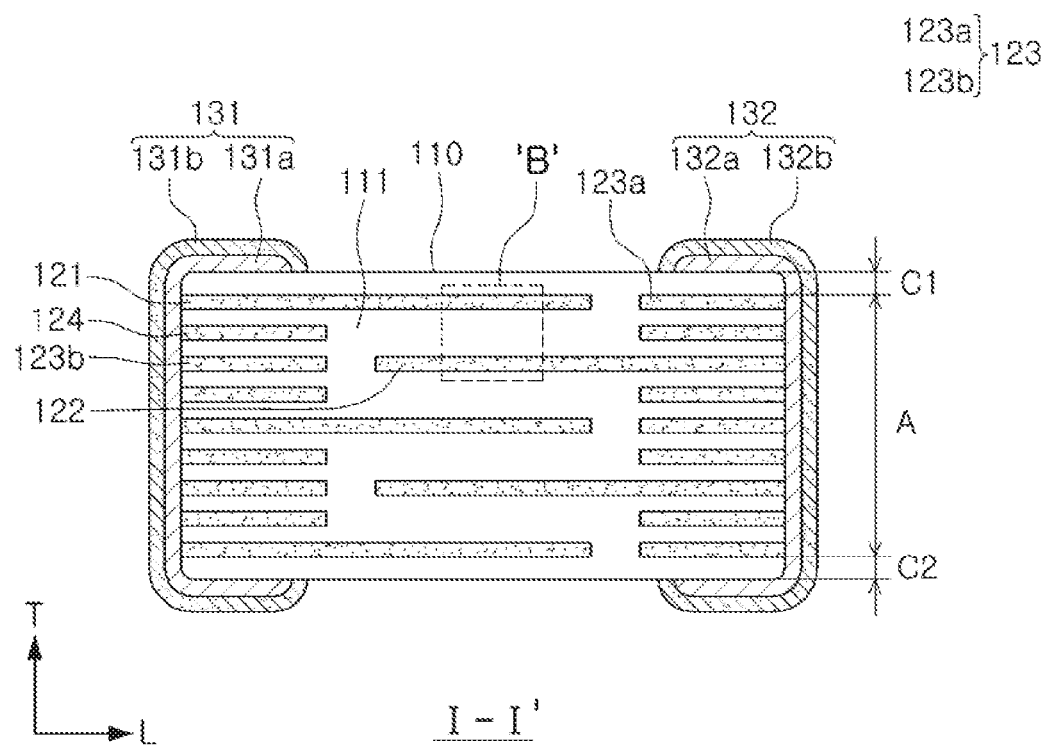
FIG. 3 is a cross-sectional view taken along line I-I' in FIG. 1 according to an exemplary embodiment of the present disclosure.

FIG. 1 is a perspective view of a multilayer ceramic capacitor according to an exemplary embodiment. FIG. 2 is a schematic diagram of a ceramic body according to an exemplary embodiment of the present disclosure. FIG. 3 is a cross-sectional view taken along line I-I' in FIG. 1 according to an exemplary embodiment of the present disclosure.

Referring to FIGS. 1 to 3, a multilayer ceramic electronic component 100 according to an exemplary embodiment may include a ceramic body 110 and first and second external electrodes 131 and 132. The ceramic body 110 includes dielectric layers 111 and a plurality of first and second internal electrodes 121 and 122 disposed to face each other with each of the dielectric layers interposed therebetween. The ceramic body 110 has a first surface S1 and a second surface S2 disposed to oppose each other in a first direction, a third surface S3 and a fourth surface S4 connected to the first surface S1 and the second surface S2 and disposed to oppose each other in a second direction, and a fifth surface S5 and a sixth surface S6 connected to the first surface S1 to the fourth surface S4 and disposed to oppose each other in a third direction. The first and second external electrodes 131 and 132 are disposed on external surfaces of the ceramic body 110 and are electrically connected to the plurality of first and second internal electrodes 121 and 122. The first internal electrodes 121 are exposed to one surface of the ceramic body 110, and the second internal electrodes 122 are exposed to the other surface opposite to the one end of the ceramic body 110. A strength enhancing material layer 124 is disposed between the first and second internal electrodes 121 and 122 opposing each other.

Hereinafter, a multilayer ceramic electronic component according to an exemplary embodiment will be described, in detail, a multilayer ceramic capacitor will be described. However, the multilayer ceramic electronic component is not limited thereto.

In the multilayer ceramic electronic component 100 according to an exemplary embodiment, a 'length direction' will be defined as an 'L' direction of FIG. 1, a 'width direction' will be defined as a 'W' direction of FIG. 1, and a 'thickness direction' will be defined as a 'T' direction of FIG. 1. The 'thickness direction' will be the same as a direction in which dielectric layers are laminated, for example, a 'laminated direction'.

A shape of the ceramic body 110 is not limited, but may be a rectangular parallelepiped shape as illustrated.

The ceramic body 110 may have a first surface S1 and a second surface S2 disposed to opposite each other in a first direction, a third surface S3 and a fourth surface S4 connected to the first surface S1 and the second surface S2 and disposed to oppose each other in a second direction, and a fifth surface S5 and a sixth surface S6 connected to the first surface S1 to the fourth surface S4 and disposed to oppose each other in a third direction.

The first and second surfaces S1 and S2 may be defined as surfaces disposed to oppose each other in a thickness direction of the ceramic body 110, that is, the first direction. The third and fourth surfaces S3 and S4 may be defined as surfaces disposed to oppose each other in a length direction of the ceramic body 110 that is the second direction. The fifth and sixth surfaces S5 and S6 may be defined as surfaces disposed to oppose each other in a width direction of the ceramic body 110, that is, the third direction.

One ends of the plurality of first and second internal electrodes 121 and 122 disposed in the ceramic body 110 are exposed to the third surface S3 or the fourth surface S4 of the ceramic body 110.

The first and second internal electrodes 121 and 122 may include a pair of first and second internal electrodes 121 and 122 having polarities different from each other.

One ends of the first internal electrodes 121 may be exposed to the third surface S3, and one ends of the second internal electrode 122 may be exposed to the fourth surface S4.

The other ends of the first internal electrodes 121 are spaced apart from the third surface S3 or the fourth surface S4 at regular intervals, which will be described in detail later.

The first and second external electrodes 131 and 132 may be disposed on the third and fourth surfaces S3 and S4 of the ceramic body 110, respectively, and may be electrically connected to the internal electrodes.

In an exemplary embodiment, a raw material for forming the dielectric layer 111 is not limited as long as sufficient capacitance may be obtained. For example, the raw material for forming the dielectric layer 111 may be a barium titanate-based material, a lead complex Perovskite-based material, a strontium titanate-based material, or the like.

The raw material for forming the dielectric layer 111 may be prepared by adding various ceramic additives, organic solvents, plasticizers, binders, dispersants, and the like, to powder particles such as the barium titanate ($BaTiO_3$) powder particles, or the like, according to an object of the present disclosure.

The ceramic body 110 may include an active portion A as a portion of the capacitor contributing to formation of capacitance, and a top cover portion C1 and a bottom cover portion C2, as margin portions, disposed above and below the active portion A, respectively.

The active portion A may be formed by repeatedly laminating the plurality of first and second electrodes 121 and 122 with each of the dielectric layers 111 interposed therebetween.

The top and bottom cover portions C1 and C2 may have the same material and configuration as the dielectric layer 111, except that internal electrodes are included therein.

For example, the top cover portion C1 and the bottom cover portion C2 may include a ceramic material such as a barium titanate ($BaTiO_3$)-based ceramic material.

The top cover portion C1 and the bottom cover portion C2 may be formed by vertically laminating a single dielectric layer or two or more dielectric layers on top and bottom surfaces of the active portion A, and may basically serve to prevent the internal electrodes 121 and 122 from being damaged by physical or chemical stress.

A material for forming the first and second internal electrodes 121 and 122 is not limited, but may be a conductive paste including one or more of silver (Ag), lead (Pb), platinum (Pt), nickel (Ni), and copper (Cu).

A multilayer ceramic capacitor according to an exemplary embodiment may include a first external electrode 131 electrically connected to the first internal electrode 121 and a second external electrode 132 electrically connected to the second internal electrode 122.

The first and second external electrodes 131 and 132 may be electrically connected to the first and second internal electrodes 121 and 122 to form capacitance, and the second external electrode 132 may be connected to a potential different from a potential to which the first external electrode 131 is connected.

The first and second external electrodes 131 and 132 may be disposed on the third surface S3 and the fourth surface S4 in the length direction of the ceramic body 110, that is, the second direction, respectively, and may be disposed to extend to the first surface S1 and the second surface S2 in the thickness direction of the ceramic body 110, that is, the first direction.

The external electrodes 131 and 132 are disposed on external surfaces of the ceramic body 111, and may include electrode layers 131a and 132a electrically connected to the internal electrodes 121 and 122 and conductive resin layers 131b and 132b disposed on the electrode layers 131a and 132a.

The electrode layers 131a and 132a may include a conductive metal and a glass.

The conductive metal used in the electrode layers 131a and 132a is not limited as long as a material thereof may be electrically connected to the internal electrode to form capacitance, but may be, for example, at least one selected from the group consisting of copper (Cu), silver (Ag), nickel (Ni), and alloys thereof.

The electrode layers 131a and 132a may be formed by applying a conductive paste prepared by adding a glass frit to the conductive metal powder particles and sintering the conductive paste.

The conductive resin layers 131b and 132b are disposed on the electrode layers 131a and 132a, and may be disposed to completely cover the electrode layers 131a and 132a.

A base resin included in the conductive resin layers 131b and 132b is not limited as long as a material thereof may be mixed with conductive metal powder particles to prepare a paste, and may include, for example, an epoxy-based resin.

A conductive metal included in the conductive resin layers 131b and 132b is not limited as long as a material thereof may be electrically connected to the electrode layers 131a and 132a, and may include, for example, at least one selected from the group consisting of copper (Cu), silver (Ag), nickel (Ni), and alloys thereof.

According to an exemplary embodiment, a strength enhancing material layer 124 may be disposed between the first and second internal electrodes 121 and 122 opposing each other to enhance flexural strength of a multilayer ceramic capacitor.

The strength enhancing material layer 124 is disposed between the first and second internal electrodes 121 and 122 opposing each other in the thickness direction of the ceramic body 110, that is, the first direction.

Recently, as industrial interest in electric components has increased, multilayer ceramic capacitors have been required to have high-reliability and high-strength characteristics to be used in automobile or infotainment systems.

In detail, a multilayer ceramic capacitor for an electric component employs low-capacitance models to secure withstand voltage characteristics. In this case, internal electrodes formed using an open mode design or a floating mode design are applied to the multilayer ceramic capacitor.

In the case in which internal electrodes of an open mode or a floating mode are applied to such a multilayer ceramic capacitor for an electric component, an insufficient number of laminated internal electrodes results in poor contact with external electrodes and degradation in flexural strength characteristics.

According to an exemplary embodiment, the strength enhancing material layer 124 may be disposed between the first and second internal electrodes 121 and 122 opposing each other in a thickness direction, which is the first direction of the ceramic body 100, to enhance flexural strength of the multilayer ceramic capacitor.

The strength enhancing material layer 124 may be a conductive material, but is not limited thereto.

In the case in which the strength enhancing material layer 124 is a conductive metal layer, the conductive metal may be the same as a metal included in the first and second internal electrodes 121 and 122.

In detail, the conductive metal may include at least one of silver (Ag), lead (Pb), platinum (Pt), nickel (Ni), and copper (Cu).

On the other hand, the strength enhancing material layer 124 may include a resin.

In the case in which the strength enhancing material layer 124 includes a resin, the resin may be an epoxy resin, but is not limited thereto.

Additionally, in the case in which the strength enhancing material layer 124 includes a resin, the strength enhancing material layer 124 may further include a conductive metal. In this case, the conductive metal may be copper (Cu).

According to an exemplary embodiment, since the strength enhancing material layer 124 is disposed between the first and second internal electrodes 121 and 122 opposing each other in the thickness direction of the ceramic body 110, that is, the first direction, the strength enhancing material layer 124 is disposed in the active portion A of the ceramic body 110.

For example, the strength enhancing material layer 124 is disposed between the first and second internal electrodes 121 and 122 opposing each other in the thickness direction of the ceramic body 110, that is, the first direction, as in the active portion A, and is not disposed in the top and bottom cover portions C1 and C2 disposed above and below the active portion A, respectively, as margin portions.

The strength enhancing material layer 124 may be provided in plural. The strength enhancing material layer 124, provided in plural, may be exposed to one surface of the ceramic body and the other surface, opposing the one surface of the ceramic body and may be spaced apart from each other.

Referring to FIG. 3, the strength enhancing material layer 124 has one end exposed to the third surface S3 or the fourth surface S4 of the ceramic body 110, similarly to the exposed one ends of a plurality of first and second internal electrodes 121 and 122 disposed in the ceramic body 110.

Among the strength enhancing material layers 124, the strength enhancing material layer 124 exposed to the third surface S3 of the ceramic body 110 overlaps the first internal electrode 121 but does not overlap the second internal electrode 122.

Similarly, among the strength enhancing material layers 124, the strength enhancing material layer 124 exposed to the fourth surface S4 of the ceramic body 110 overlaps the second internal electrode 122 but does not overlap the first internal electrode 121.

The strength enhancing material layers 124 may be exposed to one surface of the ceramic body 110 and the other surface, opposing the one surface of the ceramic body 110 and may be spaced apart from each other on the same plane.

As will be described later, the strength enhancing material layer 124 may have a length equal to a length of a first dummy electrode 123a and a length of a second dummy electrode 123b in the length direction of the ceramic body 110.

According to an exemplary embodiment, the multilayer ceramic electronic component 100 may further include dummy electrode 123 exposed to one surface of the ceramic body 110 and the other surface, opposing the one surface of the ceramic body 110.

More specifically, the multilayer ceramic electronic component 100 may further include first dummy electrodes 123a exposed to the other surface opposing to one surface of the ceramic body 110, to which the first internal electrode 121 is exposed, on the same layer as the dielectric layer 111 on which the first internal electrode 121 is disposed.

The first internal electrode 121 may be exposed to the third surface S3 in the length direction of the ceramic body 110, and the first dummy electrode 123a may be disposed on the same layer as the dielectric layer 111 on which the first internal electrode 121 is disposed and may be exposed to the fourth surface S4 in the length direction of the ceramic body 110.

The multilayer ceramic electronic component 100 may further include second dummy electrodes 123b exposed to the other surface opposing to one surface of the ceramic body, to which the second internal electrode 122 is exposed, on the same layer as the dielectric layer 111 on which the second internal electrode 122 is disposed.

The second internal electrode 122 may be exposed to the fourth surface S4 in the length direction of the ceramic body 110, and the first dummy electrode 123b may be disposed on the same layer as the dielectric layer 111 on which the second internal electrode 122 is disposed and may be exposed to the third surface S3 in the length direction of the ceramic body 110.

In general, a multilayer ceramic capacitor for an electric component employs low-capacitance models to secure withstand voltage characteristics. In this case, internal electrodes formed using an open mode design or a floating mode design are applied to the multilayer ceramic capacitor.

In the case in which internal electrodes of an open mode or a floating mode are applied to such a multilayer ceramic capacitor for an electric component, an insufficient number of laminated internal electrodes results in poor contact with external electrodes and degradation in flexural strength characteristics.

To address the poor contact with external electrodes and the degradation in flexural strength characteristics, according to an exemplary embodiment, the multilayer ceramic electronic component 100 may further include dummy electrodes 123 exposed to one surface of the ceramic body 110 and the other surface opposing to the one end of the ceramic body 110.

The strength enhancing material layer 124 may have a length greater than or equal to a length of the first dummy electrode 123a and a length of the second dummy electrode 123b.

In the above sentence "the strength enhancing material layer 124 may have a length greater than or equal to a length of the first dummy electrode 123a and a length of the second dummy electrode 123b," the meaning of "equal" may be appreciated as a concept including a deviation in process rather than complete equality.

Figure 4:
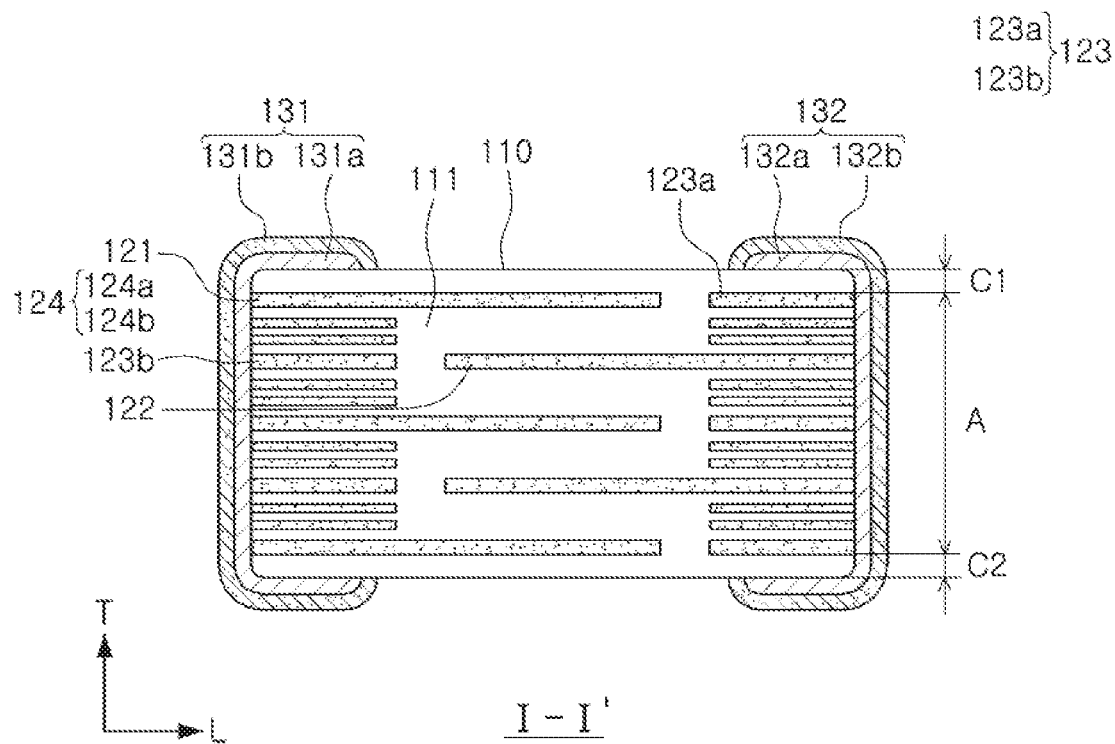
FIG. 4 is a cross-sectional view taken along line I-I' in FIG. 1 according to another exemplary embodiment of the present disclosure.

FIG. 4 is a cross-sectional view taken along line I-I' in FIG. 1 according to another exemplary embodiment of the present disclosure.

Referring to FIG. 4, strength enhancing material layers 124 exposed to one surface of the ceramic body 110 may include two or more layers.

In addition, strength enhancing material layers 124 exposed to the other surface, opposing the one surface of the ceramic body 110 may include two or more layers.

The strength enhancing material layers 124 may include two or more layers exposed to a third surface S3, that is, the one surface of the ceramic body 110 or at least two layers exposed to a fourth surface S4, that is, the other surface, opposing the one surface of the ceramic body 110, but the layers included in the strength enhancing layers 124 are not limited thereto.

For example, as shown in FIG. 4, the strength enhancing material layer 124 may include two or more layers exposed to the third surface S3, that is, the one surface of the ceramic body 100 and two or more layers exposed to the fourth surface S4 thereof opposing to the one end.

In FIG. 4, the strength enhancing material layer 124 has a double-layer structure including a first layer 124a and a second layer 124, but the structure thereof is not limited thereto and may include three or more layers.

Figure 5:
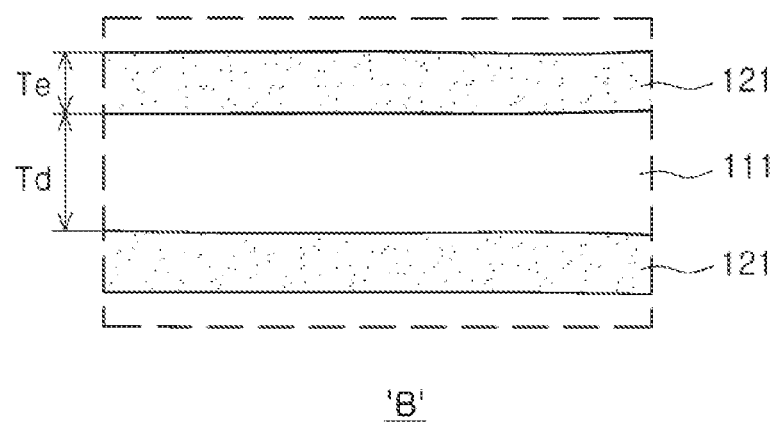
FIG. 5 is an enlarged view of region 'B' in FIG. 3.

FIG. 5 is an enlarged view of region 'B' in FIG. 3.

Referring to FIG. 5, in a multilayer ceramic electronic component according to an exemplary embodiment, a thickness of the dielectric layer 111 (td) and a thickness of each of the internal electrodes 121 and 122 (te) may satisfy td>2×te.

For example, according to an exemplary embodiment, the thickness of the dielectric layer 111 (td) is twice greater than the thickness of each of the internal electrodes 121 and 122 (te).

In general, a major issue of an electronic component for a high-voltage electrical component is a reliability problem resulting from a decrease in dielectric breakdown voltage under a high-voltage environment.

To prevent a dielectric breakdown voltage from decreasing under a high-voltage environment, the dielectric layer 111 may be formed to have the thickness td twice greater than the thickness te of each of the internal electrodes 121 and 122. Thus, dielectric breakdown voltage characteristics may be improved by increasing a thickness of the dielectric layer 111, that is, a distance between the internal electrodes 121 and 122.

When the thickness of the dielectric layer 111 (td) is not more than twice the thickness of each of the internal electrodes 121 and 122 (te), the thickness of the dielectric layer 111, that is, a distance between the internal electrodes 121 and 122 is small, and thus the dielectric breakdown voltage may be decreased.

Each of the internal electrodes 121 and 122 may have a thickness te of 1 micrometer (μm) or less, and the dielectric layer 111 may have a thickness td of 2.8 μm or less, but the thicknesses thereof are not limited thereto.

Hereinafter, a method of manufacturing a multilayer ceramic electronic component according to an exemplary embodiment will be described, but is not limited thereto.

In the method of manufacturing a multilayer ceramic electronic component according to an exemplary embodiment, slurry including powder particles such as barium titanate ($BaTiO_3$) powder particles, or the like, may be first applied onto carrier films and dried to prepare a plurality of ceramic green sheets, resulting in formation of dielectric layers.

The ceramic green sheet may be manufactured by preparing slurry by mixing ceramic powder particles, a binder, and a solvent with one another and manufacturing the slurry in a sheet shape having a thickness of several μm by a doctor blade method.

Next, a conductive paste for an internal electrode including 40 to 50 parts by weight of nickel powder particles having an average particle size of 0.1 to 0.2 μm may be prepared.

The conductive paste for an internal electrode was applied onto ceramic green sheets by a screen printing method to form internal electrodes, and the ceramic green sheets on which internal electrode patterns are disposed were laminated to form the ceramic body 110.

In a process of applying the conductive paste for an internal electrode to the green sheet, a pattern for the formation of a dummy electrode may be further formed on the same top surface as the green sheet to be spaced apart from the applied conducive paste for an internal electrode.

In addition, a paste for the formation of a strength enhancing material layer may be applied to a separate green sheet to form a strength enhancing material layer. After being inserted between green sheets on which internal electrode patterns are disposed, the strength enhancing material layer may be laminated.

The paste for formation of a strength enhancing material layer may include only a conductive metal, only an epoxy resin, or both the conductive metal and the epoxy resin.

Next, external electrode layers including a conductive metal and a glass may be formed on the external surfaces of the ceramic body 110. The conductive metal may be at least one selected from the group consisting of copper (Cu), silver (Ag), nickel (Ni), and alloys thereof.

The glass is not limited, but may be a material having the same composition as a glass used to manufacture an external electrode of a typical multilayer ceramic capacitor.

The external electrode layers may be formed on top and bottom surfaces and end portions of the ceramic body to be electrically connected to the first and second internal electrodes, respectively.

The electrode layer may contain 5 volume percent (vol %) or more of the glass relative to the conductive metal.

A conductive resin composite may applied onto the electrode layers 131a and 132a, and then be cured to form conductive resin layers 131b and 132b.

The conductive resin layers 131b and 132b may include a base resin and at least one conductive metal selected from the group consisting of copper (Cu), silver (Ag), nickel (Ni), and alloys thereof. The base resin may be an epoxy resin.

As described above, according to an exemplary embodiment, a strength enhancing material layer is disposed between first and second internal electrodes opposing to each other to improve flexural strength. Thus, reliability may be improved.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers and a plurality of first and second internal electrodes disposed to face each other with each of the dielectric layers interposed therebetween in a laminated direction, the ceramic body having first and second surfaces disposed to oppose each other in a first direction, third and fourth surfaces connected to the first and second surfaces and disposed to oppose each other in a second direction, and fifth and sixth surfaces connected to the first to fourth surfaces and disposed to oppose each other in a third direction; and
first and second external electrodes disposed on external surfaces of the ceramic body and electrically connected to the first and second internal electrodes, respectively,
wherein the first internal electrodes are exposed to the first surface of the ceramic body and the second internal electrodes are exposed to the second surface of the ceramic body,
portions of the plurality of first and second internal electrodes which overlap each other in the laminated direction define a central region extending from an uppermost internal electrode to a lowermost internal electrode in the laminated direction, among the plurality of first and second internal electrodes,
strength enhancing material layers are arranged in a region other than the central region and disposed, respectively, between the first and second internal electrodes in the laminated direction, and
each of the strength enhancing material layers includes a resin.

2. The multilayer ceramic electronic component of claim 1, wherein the resin is an epoxy resin.

3. The multilayer ceramic electronic component of claim 1, wherein each of the strength enhancing material layers further includes a conductive metal.

4. The multilayer ceramic electronic component of claim 3, wherein the conductive metal is copper (Cu).

5. The multilayer ceramic electronic component of claim 1, wherein the strength enhancing material layers are exposed to the first and second surfaces of the ceramic body and are spaced apart from each other.

6. The multilayer ceramic electronic component of claim 5, wherein the strength enhancing material layers exposed to the first surface of the ceramic body include two or more layers.

7. The multilayer ceramic electronic component of claim 5, wherein the strength enhancing material layers exposed to the second surface of the ceramic body include two or more layers.

8. The multilayer ceramic electronic component of claim 1, further comprising:
first dummy electrodes exposed to the second surface of the ceramic body, on the same layer as the dielectric layer on which the first internal electrode is disposed; and
second dummy electrodes exposed to the first surface of the ceramic body, on the same layer as the dielectric layer on which the second internal electrode is disposed.

9. The multilayer ceramic electronic component of claim 8, wherein the strength enhancing material layers have a length greater than or equal to a length of each of the first dummy electrodes and a length of each of the second dummy electrodes.

10. The multilayer ceramic electronic component of claim 1, wherein each of the dielectric layers has a thickness of 2.8 micrometers or less.

11. The multilayer ceramic electronic component of claim 1, wherein $td > 2 \times te$, where $td$ is a thickness of each of the dielectric layers and $te$ is a thickness of each of the internal electrodes.

* * * * *